United States Patent Office 3,427,899
Patented Feb. 18, 1969

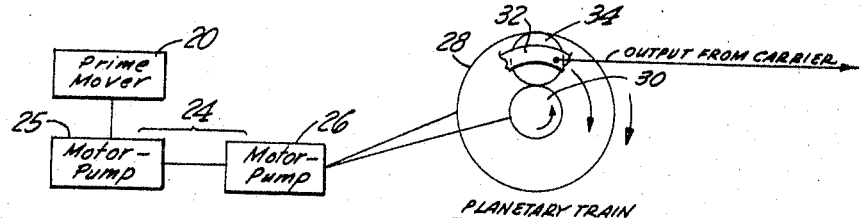
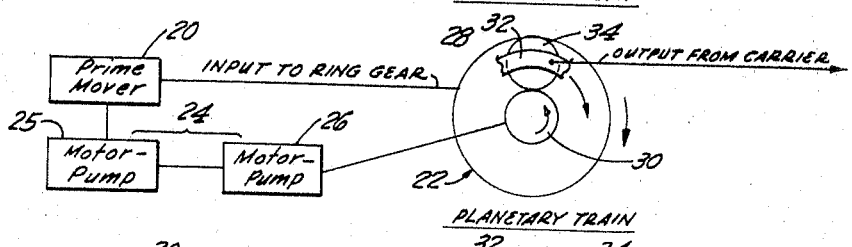
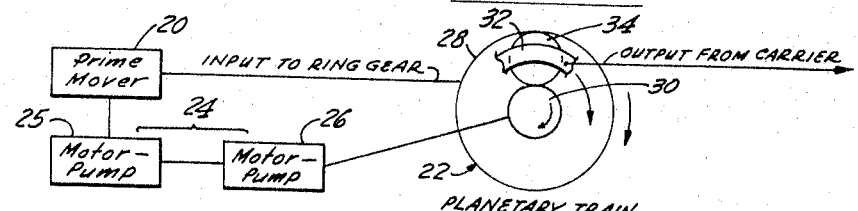
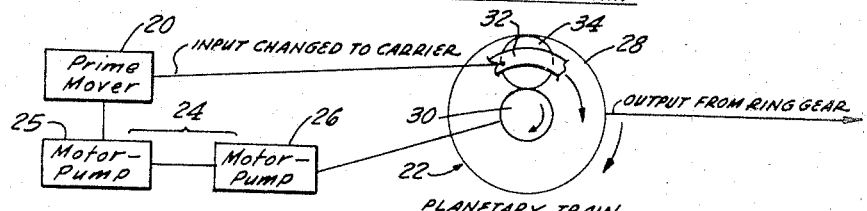
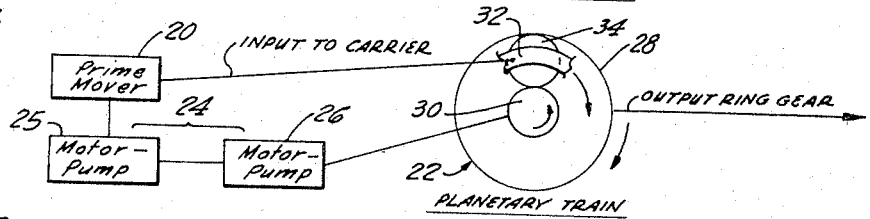
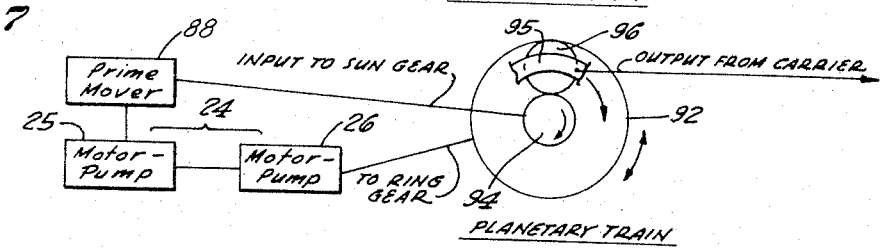

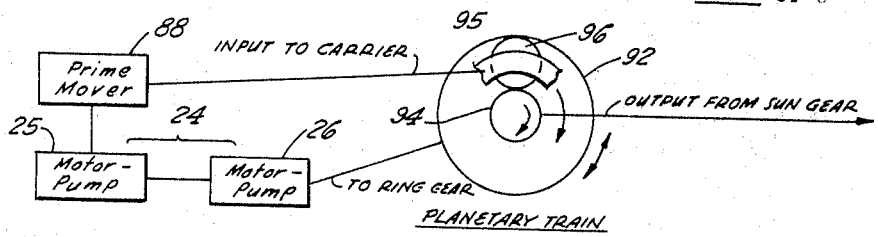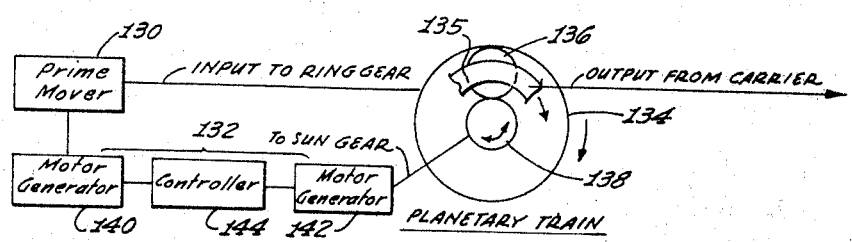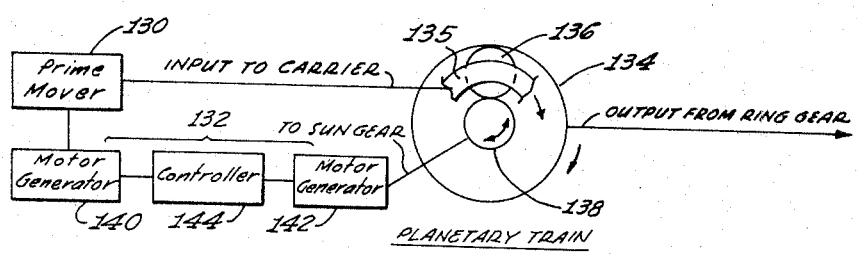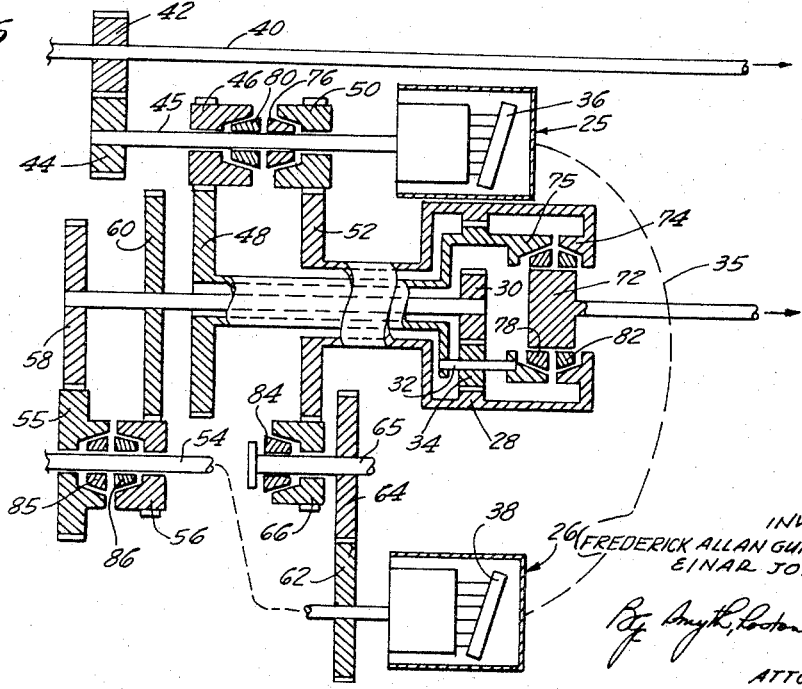

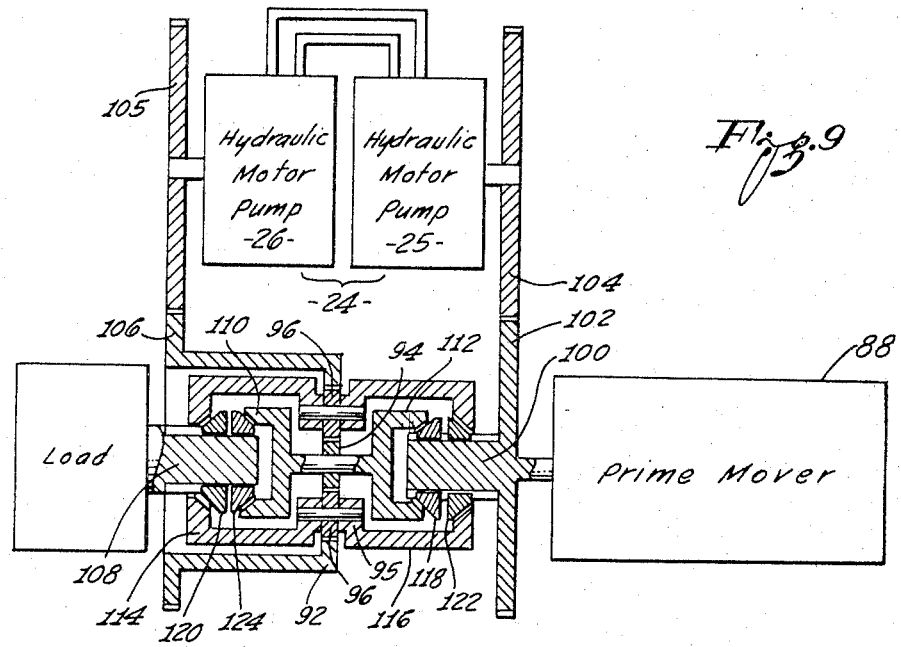
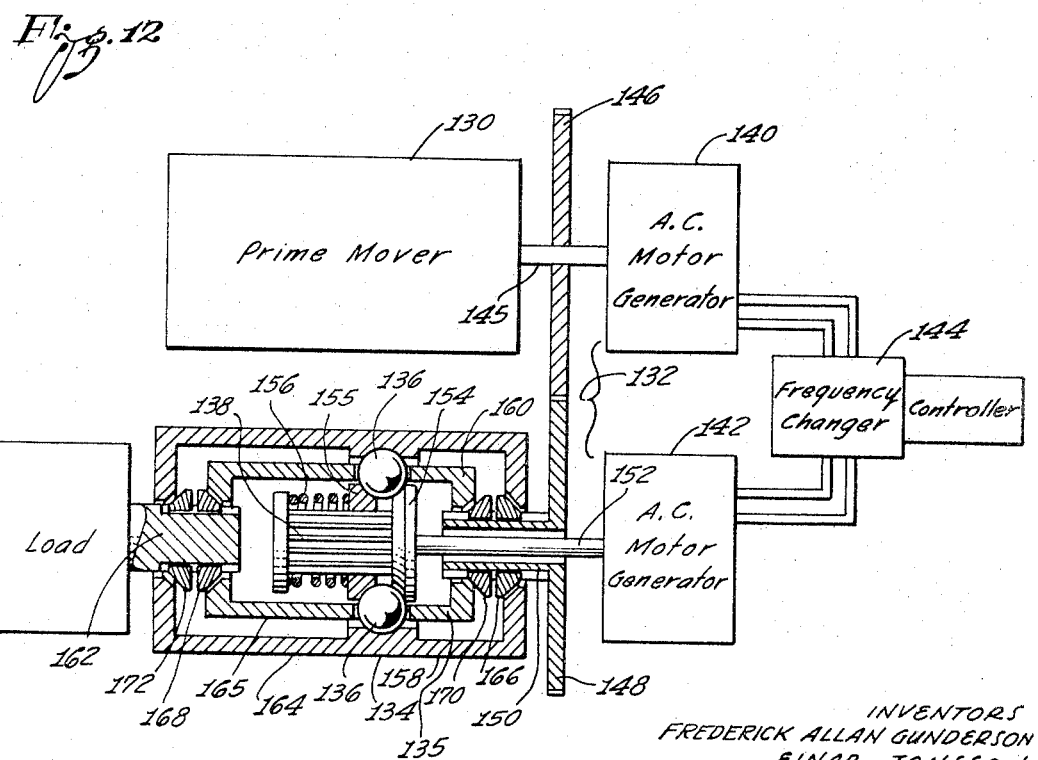

3,427,899
INFINITELY VARIABLE TRANSMISSION SYSTEM
Frederick Allan Gunderson, San Pedro, and Einar Jonsson, Palos Verdes, Calif., assignors to White Motor Corporation, Cleveland, Ohio, a corporation of Ohio
Filed Mar. 2, 1966, Ser. No. 531,172
U.S. Cl. 74—687                    22 Claims
Int. Cl. F16h 47/04, 37/06

ABSTRACT OF THE DISCLOSURE

A transmission unit comprising a reversible first hydraulic motor-pump and a reversible second hydraulic motor-pump is combined with an input shaft for power flow from the input shaft to an output shaft through simple planetary gearing that includes a ring gear, a planet gear carrier and a sun gear. For an initial low speed stage the planet gear carrier is connected to the output shaft and all of the power from the input shaft is routed through the hydraulic transmission unit to both the ring gear and the sun gear to accelerate the sun gear in one rotary direction with recirculation of power back to the input side of the transmission unit. For an intermediate speed stage the input shaft delivers power directly to the ring gear and at the same time employs the transmission unit first to decelerate the sun gear and then to accelerate the sun gear in the opposite rotary direction. For a third speed stage, the ring gear is connected to the output shaft and the input shaft delivers power directly to the planet gear carrier while employing the transmission unit first to decelerate the sun gear and then to accelerate the sun gear in the reverse direction.

---

This invention relates to a continuously variable transmission of the type in which a differential mechanism incorporating a reaction component is combined with a continuously variable transmission unit, for example a variable hydraulic transmission unit, to control the reaction component in a smooth stepless manner.

Although the invention is widely applicable for its purpose, it has special utility as a continuously variable transmission for an earth-working tractor. The description herein of a preferred embodiment for this particular practice of the invention will provide adequate guidance for those skilled in the art who may have occasion to apply the same principles to other specific purposes.

A conventional stick-shift transmission for an earth working tractor has an efficiency on the order of 95 to 98 percent but has serious disadvantages. In the first place, it is not capable of smooth gradual acceleration of the tractor from a standing start. In the second place since the transmission operates by steps it is wasteful of power and, moreover, cannot be varied infinitely to provide specific optimum gear ratios for a wide range of specific operating conditions. In the third place, since changing gears necessarily means an interruption in torque application to the load and torque interruption under conditions of heavy load causes a tractor to stall, one of a limited number of available gear ratios must be selected arbitrarily for a given operating condition and that gear ratio must be employed for a standing start with obvious disadvantages.

One expedient employed to lessen the disadvantages of a stick-shift transmission is to equip the tractor with an automatic draft control. If the tractor is pulling a plow assembly, for example, the draft control responds to an excessive rise in the drawbar load by lifting the plow assembly to reduce the depth to which the soil is penetrated. Such a draft control is helpful but varying the load to prevent stalling instead of varying the torque to prevent stalling results in working the soil in a nonuniform manner.

On the other hand a hydraulic transmission, for example an axial-piston pump connected to an axial-piston hydraulic motor, may be varied flexibly and continuously over a wide range of speed-torque ratios and makes possible a smooth gradual acceleration from a standing start. The efficiency of such an hydraulic transmission designed to cover the full speed range of a tractor would be relatively low and would require an excessively large and expensive transmission structure.

It is broadly old in the art to combine a differential mechanism with a hydraulic transmission unit to provide a stepless transmission system for an automotive vehicle and it is old to employ such a combination for two successive stages of transmission without torque interruption at the transition between the two stages. One prior art arrangement, for example, employs planetary gearing for the input and output of the transmission system in combination with a hydraulic transmission unit for carrying out the successive ranges of speed change, the hydraulic unit comprising an axial-piston pump connected to an axial-piston hydraulic motor. Stepless speed change in each range is accomplished by employing the hydraulic unit to control a reaction component of the planetary gearing and a transition from one range to another i.e., from one mode of operation of the planetary gearing to another, is accomplished by switching driving connections between two rotary components of the system either when both components are stopped or when both components are rotating synchronously. This prior art transmission is complicated and bulky largely because it employs two separate planetary trains and at least one of the two is a compound planetary train with cluster planet gears cooperating with two separate sun gears and two separate ring gears.

The present invention teaches how to combine a hydraulic transmission unit with a differential mechanism such as a planetary train to provide a stepless transmission system without the complications and other disadvantages found in the prior art. In the preferred practice of the invention, the differential mechanism is a simple planetary train having a single sun gear component, a single carrier component with a single set of planet gears and a single ring gear component. The result is a highly efficient infinitely variable transmission system of simple, compact and economical construction.

An important feature of the preferred practice of the present invention is the concept of routing all of the power through the hydraulic transmission unit to the planetary train for a stepless low range or first stage of transmission. In this first stage the input of the transmission system is through the hydraulic transmission unit to a first one of the three components of the planetary train and the output of the system is from a second one of the three components of the planetary train, the third of the three components of the planetary train being the reaction component and being also connected to the hydraulic transmission unit. One advantage of this arrangement for the lowest speed range is that it readily permits smooth gradual acceleration of a tractor from a standing start. Another important advantage is the recirculation of power through the planetary train resulting from the dual connection of the hydraulic transmission unit with the planetary train.

The preferred embodiment of the invention further provides at least two successive stages above the lowest stage with different modes of operation of the simple planetary train in each of these two higher ranges. In a manner that will be explained, the transition from the lowest stage to the second stage is carried out without torque interruption. In the second stage, the input of the system is connected directly to said first component of the planetary train and the hydraulic transmission unit is connected solely to the reaction component of the planetary train. Thereafter stepless variation of speed transmission is carried out in the second stage by employing the hydraulic unit to vary the rotation of the reaction component.

The transition from the second stage to the third stage is accomplished without torque interruption by clutch operations while the first and second components of the planetary train are rotating in synchronism. For this purpose the input of the system is momentarily connected to the second component of the three components of the planetary train in addition to its connection to the first component and the output of the system is momentarily connected to the first of the three components in addition to its connection to the second component. Then, while the first and second components of the planetary train are still rotating in synchronism, the input of the system is disconnected from the first component and the output of the system is disconnected from the second component to complete the switch of the input of the system from the first component to the second component and the switch of the output of the system from the second component to the first component. Thereafter, speed variation in the third stage is carried out in the usual manner by control of the hydraulic transmission unit over the reaction component of the planetary train.

As will be explained, the transmission range may be extended in the preferred practice of the invention by manipulation of the hydraulic transmission unit for speed increase within the unit. The transmission range may also be extended by changing the gear ratio between the hydraulic unit and the reaction component without interrupting the applied torque.

By employing the hydraulic transmission unit solely to control the reaction component in the higher ranges and by routing all of the power through the hydraulic unit in a very narrow low range of transmission with power recirculation in the low range, it becomes possible to employ a hydraulic unit of modest size for compactness of the overall transmission system. The efficiency of the overall transmission system may be reduced in the lowest speed range because all of the power is directed through the hydraulic transmission until but this reduction in efficiency occurs only momentarily in starting a tractor and is a cost well worth paying for the consequent advantages. One advantage is that a hydraulic transmission unit provides smooth gradual acceleration from a standing start with high torque delivery. Another important advantage is that the hydraulic transmission unit has a reverse speed capability for backing up a vehicle. The overall transmission system has the flexibility and stepless operation of a purely hydraulic system but has an average design-load efficiency on the order of 90 percent. The elimination of steps in the changes in speed from zero speed to maximum speed together with the relatively high efficiency results in a substantial saving in power and even greater savings in increasing the productivity of the earth-working tractor.

The various features and advantages of the invention may be understood from the following detailed description and the accompanying drawings.

In the drawings, which are to be regarded as merely illustrative:

FIGS. 1 to 5 are diagrammatic views referring to the presently preferred embodiment of the invention and showing the operating connections in the transmission system at different stages in the overall speed range;

FIG. 6 is a schematic view of the presently preferred embodiment of the invention;

FIGS. 7 and 8 are diagrammatic views relating to a second embodiment of the invention and showing the operating connections within the system in two different speed ranges;

FIG. 9 is a schematic view of the second embodiment of the invention;

FIGS. 10 and 11 are diagrammatic views relating to a third embodiment of the invention and showing the operating connections employed in the system in two different speed ranges; and FIG. 12 is a schematic view of the third embodiment of the invention.

Since the invention is characterized by a sequence of modes of operation of a differential gear accomplished by a coresponding sequence of changes in operating connections within the system, an understanding of the preferred embodiment of the invention may be approached by referring to the diagrams in FIGS. 1 to 5 which show the interconnections at different stages or ranges in the overall operation of the presently preferred embodiment of the transmission system.

FIG. 1 shows diagrammatically a prime mover 20 operatively connected to a simple planetary train solely through the medium of an infinitely variable transmission unit, generally designated 24. The requirements for such a transmission unit 24 for the purpose of the invention are that the unit be reversible in the direction of power flow and also be reversible in output direction without reversal of input direction. In this particular embodiment of the invention the transmission unit 24 comprises an adjustable axial-piston hydraulic motor-pump 25 in fluid communication with an axial-piston hydraulic motor-pump 26, the two motor-pumps being reversible in function to serve either as motors or pumps.

The planetary train may be a simple planetary train comprising an outer ring gear component 28, an inner sun gear component 30 and a carrier component 32 carrying a plurality of planet gears 34. As indicated in FIG. 1 the hydraulic motor-pump 26 is operatively connected both to the ring gear 28 and the sun gear 30 and the output from the transmission system is connected to the carrier 32. Since in this instance it is assumed that the rotation of the output is clockwise, the hydraulic motor-pump 26 drives the ring gear 28 clockwise and drives the sun gear counterclockwise.

The operating connections indicated in FIG. 1 are employed for the lowest stage in the range of operation of the transmission system and initial acceleration of the vehicle from a standing start is accomplished by accelerating the ring gear 28 clockwise and accelerating the sun gear 30 counterclockwise from stopped positions. By virtue of the two operating connections between the hydraulic motor-pump 26 and the planetary gear train, recirculation of power occurs during this initial or low stage of the operation of the transmission system, power being fed back from the carrier 32 through the sun gear 30 to the ring gear 28. The sun gear 30 is accelerated to a predetermined counterclockwise speed to complete the first stage of transmission of torque from the input to the output. As will be explained, clutch operations are then carried out to make the transition to the operating connections for the second stage, the new operating connections being shown in FIGS. 2 and 3.

In FIGS. 2 and 3 illustrating the second stage, the prime mover 20 is mechanically connected to the ring gear 28 for clockwise rotation of the ring gear as indicated and the hydraulic transmission unit 24 is connected solely to the sun gear 30. At the beginning of this second stage, the sun gear 30 is rotating counterclockwise at the previously mentioned predetermined speed and the first half of the second stage indicated by FIG. 2 is carried out by progressive adjustment of the hydraulic transmission unit 24 to decelerate the counterclockwise rotation of the sun gear to zero. In the second half of the second stage shown in FIG. 3 the transmission unit 24 is progressively adjusted to accelerate the sun gear 30 progressively from a dead stop to high speed in the clockwise direction. The second stage ends when the clockwise acceleration of the sun gear 30 results in synchronized rotation of the ring gear 28 and the carrier 32.

With the ring gear and carrier synchronized, overlapping sequential clutching is carried out to make the transition from the interconnections shown in FIG. 3 to the interconnections shown in FIG. 4. In FIG. 4 the prime mover is mechanically connected to the carrier 32 instead of being connected to the ring gear 28 and the output from the transmission system is connected to the ring gear 28 instead of being connected to the carrier 32. Thus the transition is from underdrive to overdrive.

The third stage starts as shown in FIG. 4 with the sun gear 30 rotating clockwise at high speed and is carried out by manipulating the hydraulic transmission unit 20 to progressively decelerate the sun gear 30 to zero. With the sun gear at a dead stop preferably clutch operations are carried out to change the gear ratio between the hydraulic transmission unit 24 and the sun gear 30 in preparation for completing the third stage with a steeper rise in the output speed.

In FIG. 5 representing the upper part of the third stage, the prime mover is still connected to the carrier 32 and the output of the system continues to be from the ring gear 28. The third stage is completed by accelerating the sun gear 30 from zero to maximum in the counterclockwise direction. The lowering of the gear ratio between the transmission unit and the sun gear causes acceleration of the sun gear at a new higher maximum rate.

FIG. 6 shows schematically the presently preferred embodiment of the invention for carrying out the three stages of transmission illustrated by FIGS. 1 to 5.

In FIG. 6 the previously described planetary train comprises the previously mentioned ring gear 28, sun gear 30 and carrier 32, the carrier having a plurality of planet gears 34 in mesh with both the ring gear and the sun gear. The previously mentioned hydraulic transmission unit 24 comprises an axial-piston motor-pump 25 and an axial-piston hydraulic motor-pump 26 which are in fluid communication with each other as indicated by the dotted line 35. The motor-pump 25 has the usual adjustable swash plate 36 and the hydraulic motor-pump 26 has the usual adjustable swash plate 38, the motor-pumps 25 and 26 being capable of functioning either as hydraulic motors or pumps.

The drive shaft 40 of the prime mover which may be termed the input member is connected by gears 42 and 44 to a countershaft 45 that drives the axial-piston motor-pump 25. A gear 46 that rotates freely on the countershaft 45 is operatively connected to the carrier 32, the gear being in mesh with a gear 48 that is unitary with the carrier. A second gear 50 that is freely rotatable on the countershaft 45 is in mesh with a gear 52 that is unitary with the ring gear 28.

The hydraulic motor-pump is connected to a countershaft 54 on which two gears 55 and 56 are mounted for free rotation. The gear 55 meshes with a gear 58 that is unitary with the sun gear 30 and the gear 56 meshes with a gear 60 that is also unitary with the sun gear. The ratio of the two pairs of gears differ, the ratio of gear 58 to gear 55 being lower than the ratio of gear 60 to gear 56. A gear 62 on the counter shaft 54 meshes with a gear 64 on a counter shaft 65 and a gear 66 that is freely rotatable on the shaft meshes with the previously mentioned gear 52 that is unitary with the ring gear 28.

In this particular embodiment of the invention the following gear ratios, for example, may be employed: The ratio of gear 42 to gear 44 is 1.037; the ratio of gear 48 to gear 46 is 2.87; the ratio of gear 52 to gear 50 is 2.87; and the ratio of gear 52 to gear 66 is 2.87. The ratio of gear 60 to gear 56 is 2.87 and the ratio of gear 58 to gear 55 is 1.293. The diameters of the two gears 62 and 64 are equal.

The output member of the transmission system is a shaft 70 that carries a rotary member 72 which is adjacent to a surrounding circular extension 74 of the ring gear 28 and a surrounding circular extension 75 of the carrier 32.

The structure shown in FIG. 6 is completed by a plurality of releasable connectors or clutches. A first clutch 76 is operable to releasably connect the countershaft 45 to the gear 50 thereby to connect the input member to the ring gear 28; a second clutch 78 is operative to releasably connect the output shaft 70 to the carrier 32, a third clutch 80 is operative to releasably connect the countershaft 45 to the gear 46 thereby to connect the input member to the carrier 32; a fourth clutch 82 is operative to connect the output shaft 70 to the ring gear 28; a fifth clutch 84 is operative to connect the stub shaft 65 to the gear 66 thereby to connect the hydraulic transmission unit to the ring gear 28. An additional clutch 85 is operative to connect the countershaft 54 to the gear 55 thereby to connect the hydraulic transmission unit to the sun gear and an additional clutch 86 is operative to connect the countershaft 54 to the gear 56 at a different gear ratio.

It is apparent that gears 56 and 60 constitute a first gear train which may be made effective by the clutch 86 to connect the transmission unit to the sun gear 30 and gears 55 and 58 constitute a second gear train which may be made effective by clutch 85 to connect the transmission unit to the sun gear for a higher ratio of output speed to input speed.

With the engine operating at its optimum speed for maximum torque delivery to the drive shaft 40, the hydraulic motor-pump 25 is driven at somewhat higher rate by virtue of the ratio between the gears 42 and 44. The hydraulic transmission unit comprising the hydraulic motor-pumps 25 and 26 are adjusted for zero rotation of the countershaft 54 in preparation for gradual acceleration of the tractor from a standing start. For example, at this point the swash plate 36 of the hydraulic motor-pump 25 may be adjusted for zero displacement with the swash plate 38 of the hydraulic motor-pump 26 adjusted for maximum displacement. Also in preparation for starting the tractor the second clutch 78 is engaged to connect the output shaft 70 to the carrier 32; the fifth clutch 84 is engaged to connect the motor-pump 26 to the ring gear 28 and clutch 86 is engaged to connect the motor-pump 26 to the sun gear 30. The hydraulic transmission unit is then manipulated to initiate rotation of the countershaft 54 to initiate gradual acceleration of the tractor from the standing start. For this purpose the swash plate 36 is progressively swung out of its neutral position for progressively increasing fluid displacement to cause progressive acceleration of the hydraulic motor-pump 26, the hydraulic motor-pump both accelerating the ring gear 28 clockwise and accelerating the sun gear 30 counterclockwise to cause clockwise acceleration of the carrier 32.

During this period of acceleration of the ring gear and sun gear, power is fed back from the carrier through the sun gear to the ring gear thereby effectively increasing the reduction ratio of the planetary set. The requirements for power recirculation for increasing the reduction ratio are first, that the reaction member, in this instance the sun gear, be permitted to rotate in the direction that the reaction torque tends to drive it and second, that the power be returned to the system to a point closer to the power input than the reaction member.

With the sun gear 30 accelerated to a predetermined speed in the counterclockwise direction, the rotation of the countershaft 45 is synchronized with the rotation of the gear 50. With the shaft and gear synchronized, the first clutch 76 is engaged to connect the input shaft 40 to the gear 50 thereby to connect the input shaft to the ring gear 28 and then the fifth clutch 84 is disengaged to disconnect the hydraulic motor-pump 26 from the ring gear 28 leaving the hydraulic motor-pump connected solely to the sun gear.

In the first half of the second stage of transmission represented by FIG. 2, the swash plate 36 of the hydraulic motor-pump 25 is progressively returned to neutral to decelerate the counterclockwise rotation of the sun gear and then in the latter part of the second stage represented by FIG. 3, the swash plate 36 is tilted in the opposite direction to reverse the sun gear to clockwise rotation. The reversed tilt of the swash plate is progressively increased to bring the clockwise rotation of the sun gear to a relatively high speed at which the rotation of the ring gear 28 is synchronized with the clockwise rotation of the carrier 32.

The transition from the end of the second stage represented by FIG. 3 to the beginning of the third stage represented by FIG. 4 is carried out by engaging the third clutch 80 in addition to the already engaged first clutch 76 and by engaging the fourth clutch 82 in addition to the already engaged second clutch 78. Thus while the ring gear 28 and the carrier 32 are synchronized, the input shaft 40 is momentarily connected both to the ring gear 28 and the carrier 32 and the output shaft 70 is momentarily connected both to the carrier 32 and the ring gear 28. The transition to the third stage is then completed by disconnecting the first clutch 76 and disconnecting the second clutch 82 to complete the switch of the connection of the input shaft 40 from the ring gear 28 to the carrier 32 and to complete the switch of the connection of the output shaft 70 from the carrier 32 to the ring gear 28.

At the beginning of the first part of the third stage represented by FIG. 4, with the transmission unit connected to the sun gear through gears 56 and 60 the swash plate 36 of the hydraulic motor-pump 25 is at an angle for maximum clockwise rotation of the sun gear 30 and the first part of the third stage is carried out by progressively returning the swash plate 36 to its neutral position to bring the hydraulic motor-pump 26 and the sun gear 30 to a complete stop. Then in preparation for the upper part of the third stage represented by FIG. 5, the clutch 85 is engaged to connect the now stationary countershaft 54 with the now stationary gear 55, while the clutch 86 is still engaged then the clutch 86 is disengaged to release the stationary countershaft from the gear 60. The sequential overlapping operation of the two clutches 85 and 86 transfers the connection of the hydraulic motor-pump 26 to the sun gear 30 from the gears 56, 60 to the gears 55, 58 thereby raising the ratio of speed output to speed input between the hydraulic motor-pump and the sun gear.

The second half of the third stage as represented by FIG. 5 is carried out by moving the swash plate 36 past its neutral position to accelerate the sun gear in the counterclockwise direction, the acceleration being augmented by the change in the gear ratio.

In the preferred practice of the invention a further extension of the transmission range is now carried out by progressive adjustment of the swash plate 38 of the hydraulic motor-pump 26. At the beginning of this further extension the sun gear has been accelerated to the maximum that can be obtained by progressively tilting the swash plate 36 of the hydraulic motor-pump 25 to maximum displacement while the hydraulic motor-pump 26 remains adjusted for maximum displacement. The further extension of the transmission range is carried out by progressively reducing the tilt of the swash plate 38 to progressively reduce the displacement of the hydraulic motor-pump 26 to progressively accelerate the hydraulic motor-pump while the hydraulic motor-pump 25 remains adjusted for maximum displacement. This final stage of transmission by reduction in the volumetric displacement of the hydraulic motor-pump is practical because with the delivered torque progressively reduced through the three stages of transmission the delivered torque is relatively low at this last range.

In a typical installation of the described transmission system in a tractor, the first stage of transmission represented by FIG. 1 brings the tractor from a standing start to a rate of travel of 1.8 miles per hour, the second stage of transmission represented by FIGS. 2 and 3 extend from 1.8 miles per hour to 5.3 miles per hour; the first half of the third stage represented by FIG. 4 increases the rate of travel from 5.3 miles per hour to 8 miles per hour; the last half of the third stage represented by FIG. 5 raises the rate of travel from 8 miles per hour to 14 miles per hour and the extension of the transmission range that is carried out by reducing the volumetric displacement of the hydraulic unit 26 increases the rate of travel from 14 miles per hour to 18 miles per hour.

FIGS. 7 to 9 show how in a second embodiment of the invention different components of a differential mechanism may be selected to function as the first, second and reaction components respectively to carry out only the previously described second and third stages of transmission. In this second practice of the invention a prime mover 88 is connected to a previously described hydraulic transmission unit, generally designated 24, comprising the usual hydraulic motor-pumps 25 and 26. Planetary gearing, of the same character as heretofore described comprises a ring gear component 92, a sun gear component 94 and a carrier component 95 having a plurality of planetary gears 96.

FIG. 7 represents the second stage of transmission and thus corresponds to the previously described FIGS. 2 and 3, while FIG. 8 represents the third stage and corresponds to the previously described FIGS. 4 and 5.

At the beginning of the second stage of transmission in FIG. 7 the prime mover is driving the sun gear 94 at a given rate clockwise to cause clockwise rotation of the carrier 95 and at the same time the hydraulic motor-pump 26 is permitting ring gear 92 to rotate counterclockwise at a rate to reduce the carrier 95 speed of clockwise rotation. In the first part of this stage, the hydraulic transmission unit 24 is adjusted progressively to progressively reduce the counterclockwise rotation of the ring gear 92 with consequent progressive clockwise acceleration of the carrier 95 until the ring gear comes to a complete stop.

The progressive adjustment of the hydraulic transmission in the second stage is then continued to progressively accelerate the ring gear in the clockwise direction with consequent continuation of the progressive clockwise acceleration of the carrier 95 until the carrier and the sun gear are synchronized. The synchronous clockwise rotation of the sun gear and carrier permits the required sequence of clutch operations to make the transition to the third stage by switching the connection of the prime mover from the sun gear to the carrier and by switching the output from the carrier to the sun gear.

FIG. 8 representing the third stage of transmission shows the prime mover connected directly to the carrier 95 and the transmission hydraulic unit connected directly to the ring gear 92 with the output from the sun gear 94. At the beginning of this third stage, the sun gear 93, the carrier 95 and the ring gear 92 are rotating clockwise at the same rate. The first half of the second stage of transmission is carried out by progressively adjusting the hydraulic transmission unit 24 to progressively decelerate the ring gear 92 to a complete stop with resultant progressive acceleration of the clockwise rotation of the sun gear 94. The second half of this third stage is carried out by continuing the progressive adjustment of the hydraulic transmission unit 24 to accelerate the ring gear 95 in the opposite or counterclockwise direction with consequent continuation of the progressive clockwise acceleration of the sun gear 94. Thus the two stages together provide for progressive stepless increase in the clockwise output of the transmission system.

FIG. 9 shows schematically the second embodiment of the invention for carrying out the second and third stages of transmission represented by FIGS. 7 and 8 respectively.

In FIG. 9 the prime mover 88 is connected to an input shaft 100 which carries a gear 102 in mesh with a gear 104 for driving the hydraulic motor-pump 25 of the hydraulic transmission unit 24. The hydraulic motor-pump 26 of the transmission unit is connected by gears 105 and 106 to the previously mentioned ring gear 92. The load is connected to an output shaft 108 and the sun gear 94 is unitary both with a drum 110 that overhangs the end of the output shaft 108 and a second drum 112 that overhangs the end of the input shaft 100. In like manner the carrier 95 has a cylindrical extension 114 that surrounds the output shaft 108 and has a second cylindrical extension 116 that surrounds the input shaft 100.

A first clutch on the input shaft 100 is cooperative with the drum 112 to releasably connect the input shaft to the sun gear 94 and a second clutch 120 on the output shaft 108 is cooperative with the cylindrical extension 114 to releasably connect the output shaft to the carrier 95. A third clutch 122 on the input shaft 100 is cooperative with the cylindrical extension 116 to releasably connect the input shaft to the carrier 95 and a fourth clutch 124 on the output shaft 108 is cooperative with the drum 110 to releasably connect the output shaft to the sun gear 94.

FIGS. 10 to 12 relate to a third embodiment of the invention for carrying out only the second and third stages of transmission, the second stage being represented by FIG. 10 and the third stage being represented by FIG. 11.

In this third embodiment a prime mover 130 and a transmission unit, generally designated 132, cooperate with a planetary train comprising an outer ring component 134, a carrier component 135 having a plurality of planet elements 136 and an inner sun component 138. In this instance the transmission unit 132 comprises a motor-generator 140 and a second motor-generator 142. A.C. current is employed and an adjustable frequency changer 144 is interposed between the two motor-generators to permit stepless adjustment of the operation of the transmission unit.

In FIG. 10 which illustraes the second stage, the prime mover 130 is directly connected to the ring component 134 and the transmission unit 132 is connected to the sun component 138. At the beginning of the second stage represented by FIG. 10 the ring component 134 is driven clockwise at a relatively high rate and the transmission unit 132 permits rotation of the sun component counterclockwise at an appropriate rate to cause the carrier component 135 to impact clockwise rotation to the load. The first stage of transmission is carried out by progressively adjusting the transmission unit 132 to progressively decelerate the counterclockwise rotation of the sun component 138 and then to progressively accelerate the sun component in the clockwise direction until the rotation of the carrier component 135 is synchronized with the rotation of the ring component 134.

The connection of the prime mover 130 is then switched from the outer ring component 134 to the carrier component 135 and the connection of the output is switched from the carrier component to the ring component to make the transition to the third stage. To carry out the third stage represented by FIG. 11, the transmission unit 132 is progressively adjusted to decelerate the clockwise rotating sun component 138 and then to progressively accelerate the sun component in the counterclockwise direction.

In FIG. 12 which shows the third embodiment of the invention, the drive shaft 145 of the prime mover 130 is connected to the first motor-generator 140 and carries a gear 146 which meshes with a gear 148 on a splined tubular input shaft 150. A shaft 152 from the second motor-generator 142 extends through the tubular input shaft 150 and is unitary with the sun component 138 of the planetary train. The planet elements 136 are in the form of balls which seat against the inner circumferential surface of the outer ring component 134 and are under pressure from two opposed collars 154 and 155 of the sun component. In the construction shown the collar 154 is fixed to the sun component but the collar 155 is slidingly keyed to the sun component to respond to the pressure of a coil spring 156.

The tubular input shaft 150 extends through a cylindrical extension 158 of the outer ring component 134 and also extends through a cylindrical extension 160 of the carrier component 135. In like manner the output shaft 162 extends through a cylindrical extension 164 of the ring component 134 and a second cylindrical extension 165 of the carrier component 135.

A first clutch 166 on the tubular input shaft 150 is cooperative with the cylindrical extension 158 to releasably connect the input shaft to the outer ring component 134 and a second clutch 168 on the output shaft 162 is cooperative with the cylindrical extension 165 to releasably connect the output shaft to the carrier component 135. A third clutch 170 on the tubular input shaft 150 is cooperative with the cylindrical extension 160 to releasably connect the input shaft with the carrier component 135 and a fourth clutch 172 on the output shaft 162 is cooperative with the cylindrical extension 164 to releasably connect the output shaft to the outer ring component 134.

At the beginning of the second stage of transmission represented by FIG. 10, the first clutch 166 is engaged to connect the input shaft 150 to the outer ring component 134 and the second clutch 168 is engaged to connect the output shaft 162 to the carrier component 135, the third clutch 170 and the fourth clutch 172 being disengaged. The second stage is carried out by first decelerating the counterclockwise rotating sun component and then accelerating the sun component clockwise until the clockwise rotation of the carrier component 135 is synchronized with the clockwise rotation of the ring component 134.

The third clutch 170 and the fourth clutch 172 are then engaged to cause the four clutches to lock the planetary system for directly connecting the input shaft 150 to the output shaft 162 and then the first clutch 166 and the second clutch 168 are disengaged to leave the input shaft 150 connected solely to the carrier component 135 and to leave the output shaft 162 connected solely to the ring component 134. The third stage of transmission represented by FIG. 11 is then carried out by first decelerating the counterclockwise rotation of the sun component and then accelerating the sun component in the counterclockwise direction.

It is apparent from consideration of the different embodiments of the invention that any two of the three components of a planetary train may be connected to the input and the output, respectively, with the third component serving as the reaction component under the control of a transmission unit that is actuated by the prime mover. It is also apparent that whichever of the three components is selected for the reaction component, that component may be controlled to bring the other two components into synchronism for the purpose of changing the input and output connections without interrupting the torque delivered to the load. It is further apparent that in each embodiment of the invention, the variable transmission unit may be operated as a brake whenever desired.

Our description in specific detail of the selected embodiments of the invention will suggest various changes, substitutions and other departures from our disclosure within the spirit and scope of the appended claims.

We claim:

1. A method of operating differential mechanism for stepless transmission of torque from an input to an output wherein the differential mechanism has a rotary reaction component, characterized by the use of clutches and a continuously variable transmission unit which is reversible in output direction without reversal of input direction and is reversible in direction of power flow, characterized by the steps of:

transmitting torque from the input to the differential mechanism solely through the transmission unit and transmitting the torque from the differential mechanism to the output in an initial stage of transmission;

making a transition to a second higher stage by overlapping clutch operations to connect the input to the output through the differential mechanism with a given sequence of transmission through the differential mechanism;

carrying out the second stage by stepless control of the reaction component by the transmission unit;

making a transition to a third higher stage by overlapping clutch operations to connect the input to the output through the differential mechanism with a different sequence of transmission through the differential mechanism; and carrying out the third stage of transmission by stepless control of the reaction component by the transmission unit.

2. A method as set forth in claim 1 in which said given sequence of transmission through the differential mechanism is selected to underdrive the output and said different sequence is selected to overdrive the output.

3. A method as set forth in claim 1 in which the reaction component is brought to a stop at an intermediate point in the third stage of transmission and which includes the step of changing the gear ratio between the transmission unit and the reaction component while the reaction component is stopped thereby to step up the rate of rotation of the reaction component in response to subsequent acceleration of the rate of output by the transmission unit.

4. A method as set forth in claim 1 in which the transmission unit comprises two variable displacement motor-pumps, each of which is capable of functioning either as a pump or a motor;

in which in the third stage one of the two motor-pumps functions as a pump at relatively high volumetric displacement with the other motor-pump functioning as a motor; and in which increased output speed is obtained in the third stage by progressively reducing the volumetric displacement of said other motor-pump.

5. A method of operating differential mechanism for stepless transmission of torque from an input to an output wherein the differential mechanism has a rotary reaction component, characterized by the use of clutches and a continuously variable transmission unit which is reversible in output direction without reversal of input direction and is reversible in direction of power flow, characterized by the steps of:

transmitting torque from the input to the differential mechanism solely through the transmission unit and transmitting the torque from the differential mechanism to the output in an initial stage of transmission with a reaction component of the differential mechanism permitted to rotate in the direction that the reaction torque tends to drive it and with power return from the reaction component to the differential mechanism at a point closer to the input than the reaction component for recirculation of power to obtain increased speed reduction ratio;

making a transition to a second higher stage by overlapping clutch operations to connect the input to the output through the differential mechanism with a given sequence of transmission through the differential mechanism;

carrying out the second stage by stepless control of the reaction component by the transmission unit;

making a transition to a third higher stage by overlapping clutch operations to connect the input to the output through the differential mechanism with a different sequence of transmission through the differential mechanism; and carrying out the third stage of transmission by stepless control of the reaction component by the transmission unit.

6. A method of operating differential mechanism to transmit torque to an output member, wherein the differential mechanism has a plurality of components and a reaction component, comprising the steps of:

applying power both to a first one of said plurality of components and to said reaction component with a second one of said plurality of components connected to the output member thereby to initiate rotation of the output member in a given rotary direction by initiating rotation of the first component in the given direction and initiating simultaneous rotation of the reaction component in the opposite direction;

carrying out a low stage of transmission by progressively accelerating the reaction component in said opposite direction to a predetermined velocity;

carrying out a higher stage of transmission by first progressively decelerating the rotation of the reaction component in said opposite direction and then accelerating rotation of the reaction component in said given direction until said first and second components rotate synchronously in the given direction;

while said first and second components are rotating synchronously, making a transition to a still higher stage without torque interruption by switching the connection of the input member from the first component to the second component and switching the connection of the output member from the second component to the first component; and carrying out the still higher stage of transmission by first progressively decelerating the rotation of the reaction component in the given direction to zero and then progressively accelerating the rotation of the reaction component in the opposite direction.

7. A method as set forth in claim 6 in which said low stage of transmission is carried out by operatively connecting the input member to both said first component and said reaction component through a transmission unit that is reversible in output direction without reversal of input direction and is reversible in direction of power flow to cause recirculation of power from the first component through the reaction component back to the first component for greater reduction of speed of the output member.

8. A method of operating a differential mechanism having a sun component, a carrier component carrying a plurality of planet elements and a ring component for continuously variable power transmission from an input member to an output member, said method being characterized by the use of a continuously variable transmission unit that is reversible in output direction without reversal of input direction and is reversible in direction of power flow, said method including the steps of:

connecting the input member solely to the transmission unit to carry out a first stage of transmission to the output member;

connecting the transmission unit to a first of said three components of the differential mechanism for carrying out the first stage;

connecting the output member to a second of said three components of the differential mechanism for carrying out the first stage with the third of the three components of the differential mechanism serving as the reaction component;

connecting the transmission unit additionally to said reaction component of the differential mechanism for carrying out the first stage;

carrying out said first stage of transmission by adjusting the transmission unit progressively to progressively change the rotation imparted to the reaction component;

making a transition from said first stage of transmission to a second stage of transmission by connecting the input member to said first of the three components while the input member is synchronized with said first component and by disconnecting the transmission unit from said first of the three components of the differential mechanism leaving said first component of the differential mechanism driven solely by the input member; and carrying out said second stage of transmission by progressively adjusting the transmission unit to progressively change the rotation of said reaction component to continue the progressive change in rotation imparted to the output member.

9. A method as set forth in claim 8 in which the second stage of transmission is carried out until said first and second components of the three components of the differential mechanism are synchronized and which includes the additional steps of:

connecting the input member to said second of the three components as well as to said first of the three components of the differential mechanism while said first and second components are synchronized;

connecting the output member to said first of the three components as well as to said second of the three components of the differential mechanism while said first and second components are synchronized;

disconnecting the input member from said first component and disconnecting the output member from said second component of the differential mechanism while said first and second components are synchronized thereby to shift the connection of the input member from said first component to said second component of the differential mechanism and to shift the connection of the output member from said second component to said first component of the differential mechanism; and then carrying out a third stage of transmission by progressively adjusting the transmission unit to progressively change the rotation of the reaction component to continue the progressive change in the rotation imparted to the output member.

10. A method as set forth in claim 9:

which is characterized by the use of selective gearing for connecting the transmission unit to the reaction component;

in which the reaction component is decelerated to a stop at an intermediate point in the third stage;

in which the selective gearing is operated while the reaction component is stopped to reduce the gear ratio between the transmission unit and the reaction component; and thereafter the transmission unit is progressively adjusted to progressively accelerate the reaction component.

11. A method as set forth in claim 10 in which extension of the transmission range beyond the third stage is carried out by adjusting the transmission unit progressively to accelerate said reaction component to a new maximum.

12. A method as set forth in claim 11 characterized by the use of a transmission unit comprising interconnected hydraulic pump means and hydraulic motor means:

and in which said extension of the transmission range is carried out by progressively reducing the volumetric displacement of the hydraulic motor means to accelerate the hydraulic motor means relative to the pump means for acceleration of the reaction means.

13. In a continuously variable power transmission having a rotary input member and a rotary output member, the combination of:

a differential mechanism having three rotary components;

a continuously variable transmission unit connected to the input member for actuation thereby, said transmission unit being reversible in output direction without reversal of input direction and being reversible in direction of power flow;

first connector means to releasably connect the input member to a first of said three components of the differential mechanism;

second connector means to releasably connect the output member to a second of said three components of the differential mechanism, the third of the three components serving as the reaction component;

said transmission unit being connected to said reaction component for control thereof;

third connector means to releasably connect the input member to said second of said three components;

fourth connector means to releasably connect the output member to said first of said three components;

fifth connector means to releasably connect the transmission unit to said first component;

whereby with the output member connected to said second component by said second connector means and with the transmission unit connected to said first component by said fifth connector means and also connected to said reaction component, a first low stage may be carried out by progressively adjusting the transmission unit to progressively accelerate said first component and said reaction component;

a transition to a second stage may be made while the input member is synchronized with the first component by operating said first and fifth connector means to connect the input member to said first component and disconnect the transmission unit from the first component;

then the second stage may be carried out by progressively adjusting the transmission unit to progressively change the rotation of the reaction component until the first and second components are synchronized;

then while the first and second components are synchronized a transition to a third stage may be made by operating the first four connector means to switch the connection of the input member from the second component to the first component;

and then the third stage may be carried out by progressively adjusting the transmission unit to progressively change the rotation of the reaction component.

14. A combination as set forth in claim 13 in which the ring component is said first of the three components of the planetary train and in which the carrier component is said second component of the three components.

15. A combination as set forth in claim 13 in which the sun component is said first of the three components of the planetary train and said carrier component is said second component of the three components.

16. A combination as set forth in claim 13 which includes selective gearing operatively connecting the transmission unit to the reaction component to permit changing the gear ratio between the transmission unit and the reaction component while the reaction component is stationary without interrupting the torque transmitted to the output member.

17. A combination as set forth in claim 13 in which the transmission unit comprises a variable displacement hydraulic pump connected to a variable displacement hydraulic motor.

18. A combination as set forth in claim 13 in which said first connector means has two rotary parts operatively connected to the input member and first component, respectively, whereby the transition from the first stage to the second stage may be carried out while the two rotary parts are synchronized.

19. A combination as set forth in claim 13 in which said differential mechanism is a planetary train and in which the said three components are a sun component, a carrier component carrying a plurality of planet elements and a ring component.

20. In a continuously variable power transmission having a rotary input member and a rotary output member, the combination of:

a differential mechanism having three rotary components;

a continuously variable transmission unit connected to the input member for actuation thereby, said transmission unit being reversible in output direction without reversal of input direction and being reversible in direction of power flow;

clutch means to releasably connect the input member to a first of said three components of the differential mechanism;

means to connect the output member to a second of said three components of the differential mechanism, the third of the three components serving as the reaction component, said transmission unit being connected to said reaction component for actuation thereof; and clutch means to releasably connect the transmission unit to said first of the three components of the differential mechanism;

whereby with the output member connected to said second component and with the transmission unit connected to said first component by said last mentioned clutch means for actuation of the first component and with the transmission unit also connected to said reaction component, a first low stage may be carried out by progressively adjusting the transmission unit to progressively accelerate said first component and said reaction component;

and with the input member synchronized with said first component, a transition to a second stage may be made by operating said two clutch means to connect the input member to said first component and to disconnect the transmission unit from the first component;

and then the second stage may be carried out by progressively adjusting the transmission unit to progressively change the rotation of the reaction component.

21. In a continuously variable power transmission having a rotary input member and a rotary output member, the combination of:

a differential mechanism having a plurality of components plus a reaction component;

a continuously variable transmission unit connected to the input member for actuation thereby, said transmission unit being reversible in output direction without reversal of input direction and being reversible in direction of power flow;

selective gearing operatively connecting said transmission unit to said reaction component to permit selectively changing the gear ratio between the unit and the reaction component;

first connector means to releasably connect the input member to a first of said plurality of components of the differential mechanism;

second connector means to releasably connect the output member to a second of said plurality of components of the differential mechanism;

third connector means to releasably connect the input member to said second component;

fourth connector means to releasably connect the output member to said first component;

whereby with the input member connected to said first component and the output member connected to said second component the transmission unit may control the reaction component for continuous change in the rotation of the reaction component to progressively change the rotation imparted to the output member until said first and second components are synchronized;

then while the first and second components are synchronized, said third and first connector means may be operated in sequence to shift the connection of the input member to the second component and the fourth and second connector means may be operated in sequence to shift the connection of the output member to the first component without interruption in torque transmitted to the output member; and then the transmission unit may control the reaction component through said selective gearing with continuous change in the rotation of the reaction component to continue the progressive change in the rotation imparted to the output member.

22. In a continuous variable power transmission having a rotary input member and a rotary output member, the combination of:

a differential mechanism having a plurality of components including a first component in the form of a sun gear, a second component in the form of a planet gear carrier and a third component in the form of a ring gear, the third component functioning as a reaction component;

a continuously variable transmission unit connected to the input member for actuation thereby, said transmission unit being reversible in output direction without reversal of input direction and being reversible in direction of power flow;

first connector means to releasably connect the input member to the sun gear;

second connector means to releasably connect the output member to the planetary gear carrier;

third connector means to releasably connect the input member to said planet gear carrier;

fourth connector means to releasably connect the output member to said sun gear;

whereby with the input member connected to the sun gear and the output member connected to the planet gear carrier, the transmission unit may control the ring gear for continuous change in the rotation of the ring gear to progressively change the rotation imparted to the output member until the sun gear and the planet gear carrier are synchronized;

then while the sun gear and the planet gear carrier are synchronized, said third and first connector means may be operated in sequence to shift the connection of the input member to the planetary gear carrier and the fourth and second connector means may be operated in sequence to shift the connection of the output member to the sun gear without interruption in torque transmitted to the output member; and then the transmission unit may control the ring gear with continuous change in the rotation of the ring gear to continue the progressive change in the rotation imparted to the output member.

References Cited

UNITED STATES PATENTS

| | | | |
|---|---|---|---|
| 2,181,380 | 11/1939 | Pollard | 74—691 |
| 2,803,975 | 8/1957 | Akerman et al. | 74—686 |
| 2,833,160 | 5/1958 | Morgan | 74—687 X |
| 2,972,905 | 2/1961 | Bullard | 74—687 X |
| 3,203,276 | 8/1965 | Bullard | 74—687 |
| 3,204,486 | 9/1965 | De Lalio | 74—687 |
| 3,213,358 | 10/1965 | De Lalio | 74—687 |
| 3,251,243 | 5/1966 | Kress | 74—689 |
| 3,306,129 | 2/1967 | De Lalio | 74—687 |
| 3,122,025 | 2/1964 | Mark et al. | 74—687 X |

FOREIGN PATENTS 919,988  12/1946  France.

DONLEY J. STOCKING, *Primary Examiner.*

THOMAS C. PERRY, *Assistant Examiner.*

U.S. Cl. X.R.

74—686